United States Patent
Kadlec et al.

(10) Patent No.: US 10,428,669 B2
(45) Date of Patent: Oct. 1, 2019

(54) SEALING BUSH CARRIER FOR A STEAM TURBINE AND STEAM TURBINE

(71) Applicant: Siemens Aktiengesellschaft, Munich (DE)

(72) Inventors: Ondrej Kadlec, Rousinov (CZ); Miloslav Prudek, Brno (CZ)

(73) Assignee: Siemens Aktiengesellschaft, Munich (DE)

( * ) Notice: Subject to any disclaimer, the term of this patent is extended or adjusted under 35 U.S.C. 154(b) by 435 days.

(21) Appl. No.: 14/902,863

(22) PCT Filed: Jun. 10, 2014

(86) PCT No.: PCT/EP2014/061999
§ 371 (c)(1),
(2) Date: Jan. 5, 2016

(87) PCT Pub. No.: WO2015/007434
PCT Pub. Date: Jan. 22, 2015

(65) Prior Publication Data
US 2016/0146029 A1    May 26, 2016

(30) Foreign Application Priority Data
Jul. 19, 2013 (EP) .................................. 13177156

(51) Int. Cl.
*F01D 11/00* (2006.01)
*F16J 15/02* (2006.01)
(Continued)

(52) U.S. Cl.
CPC ............ *F01D 11/00* (2013.01); *F01D 11/003* (2013.01); *F01D 11/025* (2013.01); *F16J 15/022* (2013.01);
(Continued)

(58) Field of Classification Search
CPC ...... F01D 11/00; F01D 11/003; F01D 11/005; F01D 11/025; F01D 11/02; F05D 2240/55; F16J 15/022
(Continued)

(56) References Cited

U.S. PATENT DOCUMENTS 4,651,532 A * 3/1987 Abe .......................... F01K 7/24
60/646
5,205,706 A   4/1993 Belcher
(Continued)

FOREIGN PATENT DOCUMENTS

| CN | 1837589 A | 9/2006 |
|---|---|---|
| CN | 102016231 A | 4/2011 |

(Continued)

OTHER PUBLICATIONS

English machine translation of RU 2 174 606 C2, Oct. 2001.*
(Continued)

*Primary Examiner* — Christopher Verdier
(74) *Attorney, Agent, or Firm* — Beusse Wolter Sanks & Maire

(57) ABSTRACT

A sealing bush carrier for a steam turbine, the steam turbine at least having a turbine rotor and a turbine housing, whereby the sealing bush carrier is arranged between a shaft of the rotor and the housing. The sealing bush carrier includes at least two hollow passages which extend from the rotor-facing part of the sealing bush carrier to the housing-facing part of the sealing bush carrier and are constructed such that they can be assigned to likewise hollow openings in the housing for an extraction of steam of the turbine through the passages of the sealing bush carrier into the openings of the housing. A steam turbine has a rotor with a shaft, a housing and a sealing bush carrier of this sort.

18 Claims, 4 Drawing Sheets

(51) Int. Cl.
*F01D 11/02* (2006.01)
*F16J 15/16* (2006.01)

(52) U.S. Cl.
CPC ............. *F16J 15/16* (2013.01); *F01D 11/005* (2013.01); *F05D 2220/31* (2013.01); *F05D 2240/55* (2013.01)

(58) Field of Classification Search
USPC .................................................. 415/104, 107
See application file for complete search history.

(56) References Cited

U.S. PATENT DOCUMENTS

| | | |
|---|---|---|
| 2006/0216140 A1 | 9/2006 | Dervaux et al. |
| 2006/0245912 A1 | 11/2006 | Dervaux et al. |
| 2011/0314817 A1* | 12/2011 | Zheng ................. F01D 3/02 60/661 |

FOREIGN PATENT DOCUMENTS

| | | |
|---|---|---|
| EP | 1249591 A2 | 10/2002 |
| EP | 1705340 A2 | 9/2006 |
| EP | 2143888 A2 | 1/2010 |
| EP | 2343443 A2 | 7/2011 |
| EP | 2400113 A2 | 12/2011 |
| GB | 108706 A | 8/1917 |
| GB | 108706 A1 | 8/1917 |
| GB | 108706 A | 9/1917 |
| RU | 2174606 C2 | 10/2001 |
| RU | 2252315 C1 | 5/2005 |

OTHER PUBLICATIONS

CN Office Action dated Feb. 7, 2017, based on CN patent application No. 201480040527.5.
CN Office Action dated Jul. 11, 2016, for CN application No. 201480040527.5.

* cited by examiner

STATE OF THE ART:

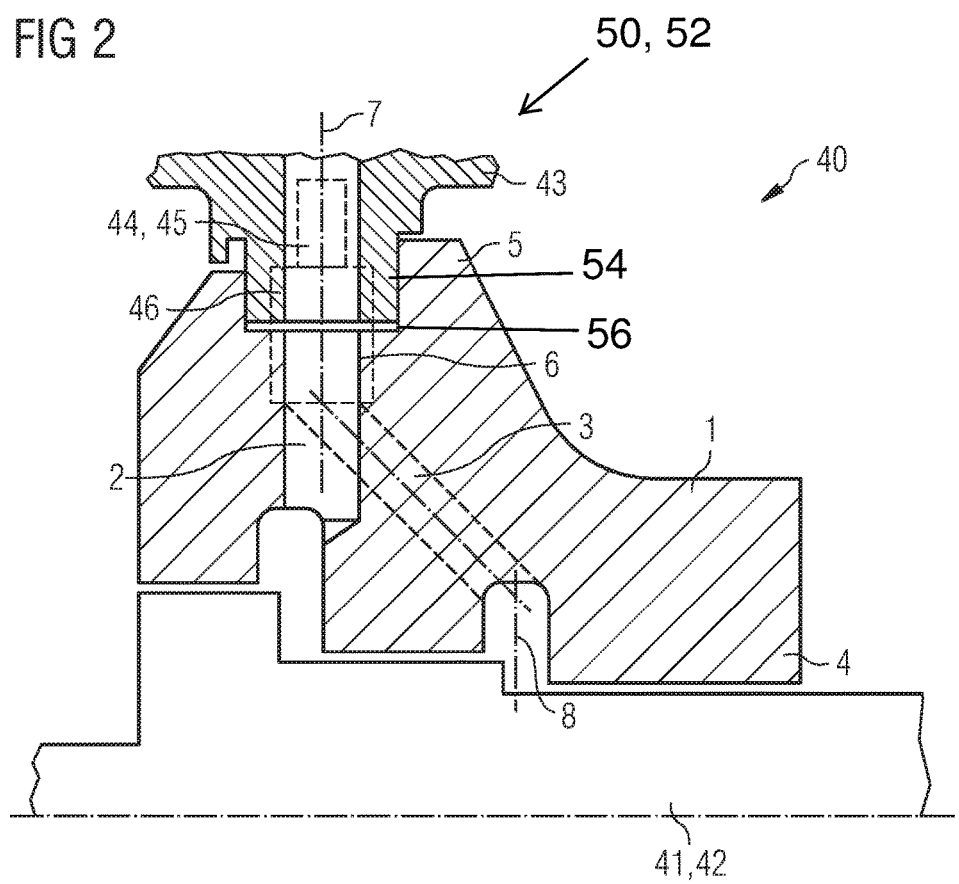

SEALING BUSH CARRIER FOR A STEAM TURBINE AND STEAM TURBINE

CROSS REFERENCE TO RELATED APPLICATIONS

This application is the US National Stage of International Application No. PCT/EP2014/061999 filed Jun. 10, 2014, and claims the benefit thereof. The International Application claims the benefit of European Application No. EP13177156 filed Jul. 19, 2013. All of the applications are incorporated by reference herein in their entirety.

FIELD OF INVENTION

The present invention is related to a sealing bush carrier for a steam turbine, the steam turbine at least comprising a turbine rotor and a turbine housing, whereby the sealing bush carrier is arranged between a shaft of the rotor and the housing. Further, the invention is related to a steam turbine, the steam turbine at least comprising a rotor with a shaft, a housing and a sealing bush carrier.

BACKGROUND OF INVENTION

A steam turbine is a common apparatus for producing mechanical energy out of the thermal energy contained in steam. The steam is guided to the blades of the turbine and puts them in motion. For this purpose the steam can be produced for example by combustion processes. The mechanical energy can then possibly be used for propulsion or, by driving a generator, for producing electric energy.

For an optimized operation of the steam turbine, it is advantageous to balance the axial thrust of the turbine rotor. This balance can be achieved with one or several sealing bushes. Such a sealing bush has the mean diameter of the blading part, which axial thrust shall be balanced. The pressures before and after the sealing bush are the same of the corresponding blading part. The pressure before the first part is the pressure after the control stage, the pressure after the last segment of the sealing bush is the exhaust pressure.

In such a sealing bush 1, as shown in FIG. 1, steam can be extracted, as indicated by arrow 20. The sealing bush carrier 1 is installed in a steam turbine 40, its rotor-facing part 4 facing the shaft 42 of the turbine rotor 41, its housing-facing part 5 facing the turbine housing 43 respectively. The sealing bush carrier 1 comprises a hollow passage 2 which is assigned to a hollow opening 44 in the turbine housing 43. The axis 7 of the passage 2 can be thought extended in the opening 43. Therefore an extraction 20 of the steam is possible. The extracted steam can be subsequently supplied to a balancing piston (not shown). Using this piston, a balancing of the axial thrust of the turbine can be done.

However, a sealing bush according to the state of the art allows only to extract steam at one distinct pressure level along the sealing bush carrier and therefore along this part of the steam turbine. For a more effective balancing, the extraction of steam at different pressure levels can be advantageous. In particular, the balancing of the axial thrust can be done more precisely and therefore the steam turbine can be operated with higher efficiency.

SUMMARY OF INVENTION

It is an object of the present invention to solve the aforesaid problems at least partly. In particular, it is an object of the present invention to provide a sealing bush carrier and a steam turbine, which allows an improved balancing of the axial thrust of a steam turbine or which can be operated with an improved balanced axial thrust respectively.

The aforesaid problems are solved by a sealing bush carrier for a steam turbine and a steam turbine, according to the claims. Further features and details of the present invention result from the sub claims, the description and the drawings. Features and details discussed with respect to the sealing bush carrier can also be applied to the steam turbine and vice versa, if of technical sense.

According to a first aspect of the invention the aforesaid object is achieved by a sealing bush carrier for a steam turbine, the steam turbine at least comprising a turbine rotor and a turbine housing, whereby the sealing bush carrier is arranged between a shaft of the rotor and the housing. The sealing bush carrier according to the invention is characterized especially by that the sealing bush carrier comprises at least two hollow passages which extend from the rotor-facing part of the sealing bush carrier to the housing-facing part of the sealing bush carrier and are constructed such that they can be assigned to likewise hollow openings in the housing for an extraction of steam of the turbine through the passages of the sealing bush carrier into the openings of the housing.

A sealing bush carrier according to the invention allows the extraction of steam at two different locations at the rotor of the turbine. The steam is withdrawn near to the shaft of the rotor of the steam turbine into each of the two hollow passages. These passages extend from the rotor-facing part of the sealing bush carrier to the housing-facing part of the sealing bush carrier and so allow a transportation of the steam through the sealing bush carrier. Additionally they can be assigned to likewise hollow openings in the housing of the turbine. This assignment is advantageous for the transportation of the extracted steam into and/or through the housing. The extracted steam can afterwards be fed into one or advantageously several, especially one for each steam extraction conduit, pistons for the balancing of the axial steam pressure of the steam turbine. Additionally or alternatively, the steam can be fed into measuring devices, for example pressure meters or thermometers.

A sealing bush carrier according to the invention therefore allows the extraction of steam in a steam turbine apparatus at two different locations, the locations arranged nearby to each other. The balancing by the pistons or the measuring of properties of the steam are therefore based on two extractions and can subsequently be done at an improved accuracy. As a result, the regulation of the axial thrust of the steam turbine can be optimized and therefore the steam turbine can be driven in a more cost- and fuel-efficient and also environmentally friendly way.

Further, a sealing bush carrier according to the invention can be characterized in that the at least two hollow passages in the sealing bush carrier are arranged such that they allow an extraction of steam at different steam pressure levels. The aim of a sealing bush carrier according to the invention is, see above, to improve the accuracy and the effectiveness of the balancing of the axial thrust of the turbine using pistons or the measurement of steam properties respectively. By ensuring that the steam is extracted at different pressure levels, these improvements can be enlarged further. For example, by using two pistons, each assigned to one of the steam extraction conduits, the pressure difference between the two extraction points can be kept constant and therefore also the pressure drop along the sealing bush carrier. In consequence, the axial thrust can be kept at a constant level in a very accurate and simultaneously simple way.

In a further advanced arrangement of a sealing bush carrier according to the invention, the ends of the passages which face the rotor are spaced axially with respect to the rotor. In a steam turbine, the pressure of the steam drops along the shaft of the rotor of the turbine in the flowing direction of the steam. Therefore, the pressure drops also along the axial extension of the sealing bush carrier. By arranging the ends of the hollow passages which face the rotor such that they are spaced axially with respect to the rotor, an extraction of the steam at different steam pressure levels can be ensured very easily.

In a further embodiment of a sealing bush carrier according to the invention, the sealing bush carrier is characterized in that the sealing bush carrier provides a sealing member in at least one of the passages, arranged at that end of the according passage which can be assigned to an opening in the housing. The sealing bush carrier can be aligned in respect to the shaft of the rotor of the turbine to ensure a tight sealing of the sealing bush against the rotor. Due to temperature differences between the turbine housing and the sealing bush carrier, during the manufacture of the turbine and also during the operation of the turbine, there have to be a clearance between the sealing bush carrier and the housing of the turbine for these necessary alignment procedures. Otherwise, the movement of the sealing bush carrier necessary for the alignment is hindered by the turbine housing and an alignment is not possible. The sealing member allows some movement during the final alignment between the turbine housing and the sealing bush carrier without losing a steam tight connection between the passage in the sealing bush carrier and the opening in the housing which the passage can be assigned to. Therefore, all the advantages of a sealing bush carrier according to the invention can be furthermore achieved in addition to the possibility of an alignment of the sealing bush carrier in respect to the shaft of the rotor of the turbine.

In addition, according to a further development of the invention, the sealing member of the sealing bush carrier provides an aperture, in particular a substantially cylindrical aperture. In this aperture, the extracted steam can be channelled from the passage in the sealing bush carrier to an assigned opening in the turbine housing. That way, the steam is channelled inside the sealing member, while at the same time outer parts of the sealing member are responsible for the tight sealing. By channelling the steam inside the sealing member only a single structural component is necessary to achieve both, the channelling of the steam and a tight sealing. This is a simplification in the manufacture of the sealing bush carrier and the whole steam turbine as well.

According to another development of the invention a sealing bush carrier can be provided, characterized in that the at least one sealing member provides two sealing surfaces, one of them assigned to the passage in the sealing bush carrier, the other constructed such that it can be assigned to the corresponding opening in the turbine housing. This splits the sealing functionality of the sealing member in half, one for a tight sealing in the passage of the sealing bush carrier, the other for a possible tight sealing in the opening of the housing. This is, above all, advantageous if the sealing bush member has to be moved in respect to the housing, for example during an alignment procedure. Each of the two sealing surfaces can ensure its tight sealing separately and therefore improve the tightness in total in respect to a single sealing surface.

A sealing bush carrier according to the invention can be further improved by comprising a sealing member characterized in that the two sealing surfaces are arranged spaced to each other along the sealing member such that a section of the sealing member with a smaller extent is located between the sealing surfaces. Along the extension of the sealing member a sealing surface with larger extent, the section with smaller extent and again a sealing surface with larger extent are arranged. Especially the section with smaller extent is not in touch with neither the sealing bush carrier nor the housing of the turbine. By this, the hindrance of a relative movement between the sealing bush member and the turbine housing, for example during an alignment procedure, can be further reduced in a very simple way.

According to another development of the invention, a sealing bush carrier is provided, characterized in that the two sealing surfaces are spherical segments, in particular symmetrical spherical segments. The sealing surfaces are further advantageously constructed such in size that they touch the side walls of the passage in the sealing bush carrier and are able to touch the side walls of the opening in the housing respectively all around their circumferences. To achieve this, the special dimensions of the passage and the opening and the respective sealing surface can be attuned. Therefore, the passages and the opening have to be at least partly cylindrical, conical or spherical. By constructing the sealing surfaces as spherical segments, in particular symmetrical spherical segments, it can be assured that during and/or after a relative movement of the sealing bush carrier and the housing, the respective sealing surface remains in contact with the respective side wall of the passage or the housing continuously. The sealing provided by the sealing member is therefore unaffected by such a relative movement. The tightness of the sealing can be ensured at all times. The special construction of the sealing surfaces is therefore a very simple and cost-efficient way to achieve this. Especially, no other structural elements are needed to ensure the continuous tightness of the sealing provided by the sealing member.

Further a sealing bush carrier according to the invention can be constructed such that the sealing member consists at least partly of steel, in particular of creep-resistant steel. The sealing member will be in direct contact to the extracted steam. This steam can reach temperatures of several hundreds of ° C. The use of steel, in particular of creep-resistant steel, ensures therefore an increased life time of the sealing member and therefore the whole apparatus.

According to another development of the invention, the sealing bush carrier provides a separate sealing member in both passages of the sealing bush carrier. This has the advantage that the tightness of both steam conduits is ensured, even during and after a relative movement of the sealing bush member and the housing, for example during an alignment procedure.

According to a second aspect of the invention, the object is solved by a steam turbine, the steam turbine at least comprising a rotor with a shaft, a housing and a sealing bush carrier. Especially, a steam turbine according to the invention is characterized in that the sealing bush carrier is constructed according to the first aspect of the invention. The use of such a sealing bush carrier provides the same advantages, which have been discussed in detail according to the sealing bush carrier of the first aspect of the invention.

Further, a steam turbine is advantageous, wherein the housing provides at least two hollow openings and each of the hollow passages in the sealing bush carrier is assigned to one of the hollow openings. This can ensure that both passages in the sealing bush carrier can be used for steam extraction. The accuracy and effectiveness of the balancing of the axial thrust of the steam turbine or the measurements of properties of the steam can therefore be improved as described above.

According to a further development of the invention, a steam turbine is provided, characterized in that the sealing bush carrier provides a sealing member in at least one of the passages, arranged at that end of that passage which is assigned to an opening in the housing whereby in both the sealing bush carrier and the housing a recess for the mounting of the sealing member is provided. The recess can especially have a larger extent than the respective passage or opening respectively and is advantageously attuned to the respective spatial dimensions of the sealing member. By providing a recess, the sealing member is easily kept in place, already by the recess itself. No further fastening means are necessary. The recesses can be of course adapted to all further improvements of the sealing member described above. Especially they can be cylindrical to ensure the mounting of sealing members with sealing surfaces constructed as spherical segments.

BRIEF DESCRIPTION OF THE DRAWINGS

The present invention is further described with respect to the accompanying figures. The figures show schematically:

FIG. 2 shows a first sectional view of a part of a steam turbine according to the invention, FIG. 3a, b shows a sealing member of a sealing bush carrier according to the invention.

DETAILED DESCRIPTION OF INVENTION

Figure 1:
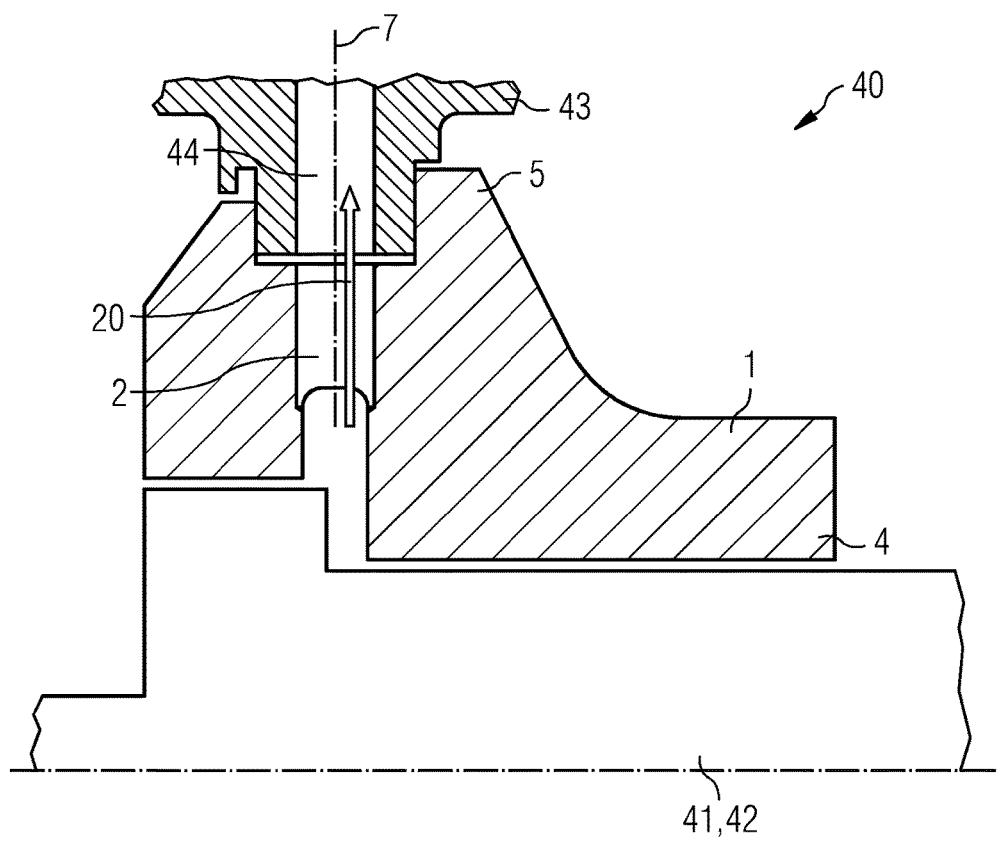
FIG. 1 shows a state of the art sealing bush installed in a steam turbine.

In FIG. 2, a sectional view of an embodiment of a steam turbine 40 according to the invention is depicted. The turbine 40 comprises especially a rotor 41 with a shaft 42, a housing 43 and a sealing bush carrier 1. The sealing bush carrier 1 is located between the shaft 42 of the rotor 41 and the housing 43. Two independent and not connected passages 2, 3 are provided in the sealing bush carrier 1, each extending from the rotor-facing part 4 to the housing-facing part 5 of the sealing bush carrier 1. The respective axis 7, 8 of each passage 2, 3 is also shown. The two passages 2, 3 are arranged one behind the other, so that in this view they partly overlap, just like the hollow openings 44, 45 in the housing 43. A recess 6 in the sealing bush carrier as well as a recess 46 in the housing 43 is depicted, too. Sealing members 10 are provided but not shown in this figure. An interlocking arrangement 50 geometrically interlocks the sealing bush carrier 1 directly with the turbine housing 43 via interlocking features 52. In an example embodiment, the interlocking features 52 include a protrusion 54 and a cavity 56 into which the protrusion 54 fits. In the example embodiment, the two passages 2, 3 communicate with the hollow openings 44, 45 through the interlocking arrangement 50. In operation, through the two passages 2, 3 steam can be extracted and guided to the respective assigned opening 44, 45 in the housing 43. Afterwards, this extracted steam can be channeled into pistons (not shown) for a balancing of the axial thrust of the steam turbine 40. Additionally or alternatively, the steam can be used to gain information about the properties of the steam, like pressure or temperature. The possibility to extract steam at two different positions along the shaft 42 of the rotor 41 through one single sealing bush carrier 1 allows a great improvement in comparison to the extraction via a single passage 2, 3. Higher accuracy, both in balancing the axial thrust of the steam turbine 40 and in measuring the properties of the steam, can be achieved.

Figure 3A:
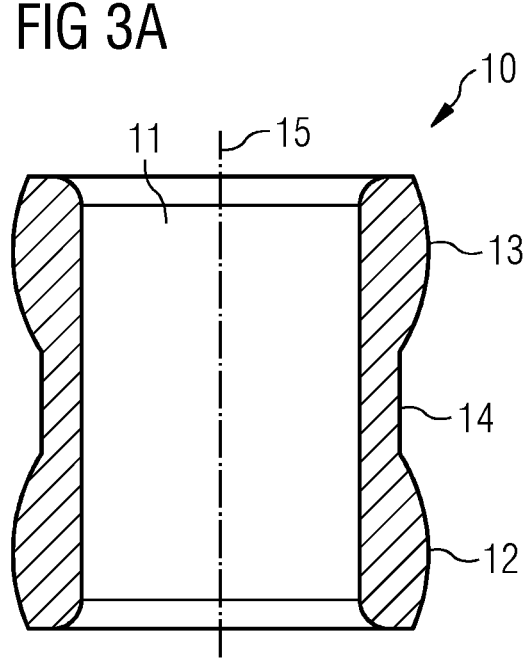
Figure 3B:
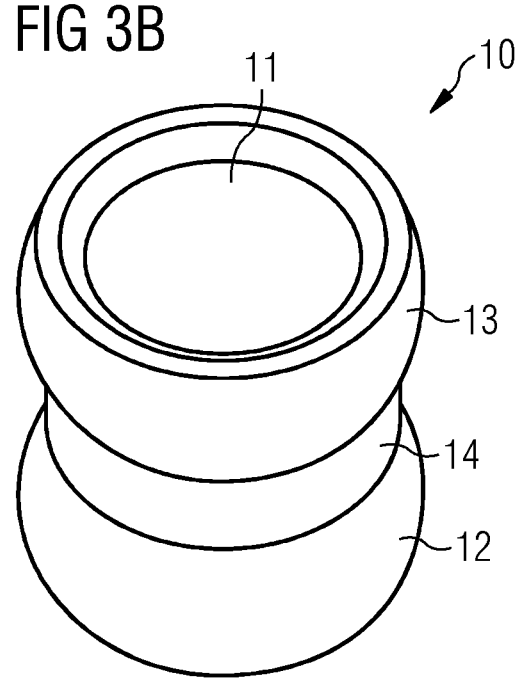

FIGS. 3a and 3b show an embodiment of a sealing member 10, in FIG. 3a in a sectional, in FIG. 3b in a perspective view. The sealing member 10 ensures a steam tight sealing between a sealing bush carrier 1 according to the invention and a housing 43 of a turbine 40 (all not shown). In this embodiment, the sealing member 10 provides two sealing surfaces 12, 13, separated by a section 14 with smaller extent. This allows, after mounting between a sealing bush carrier 1 according to the invention and a housing 43 of a turbine 40, a relative movement of the sealing bush carrier and the housing without losing the tight sealing. The sealing member 10 further provides an aperture 11 inside its body. In this aperture 11, the steam is guided from a passage 2, 3 in the sealing bush carrier 1 to the assigned opening 44, 45 in the housing 43. This compact construction of a sealing member 10 allows the use of this single structural component to achieve both a tight sealing of the steam conduit and a transportation of the steam. No further structural components are necessary.

Figure 4:
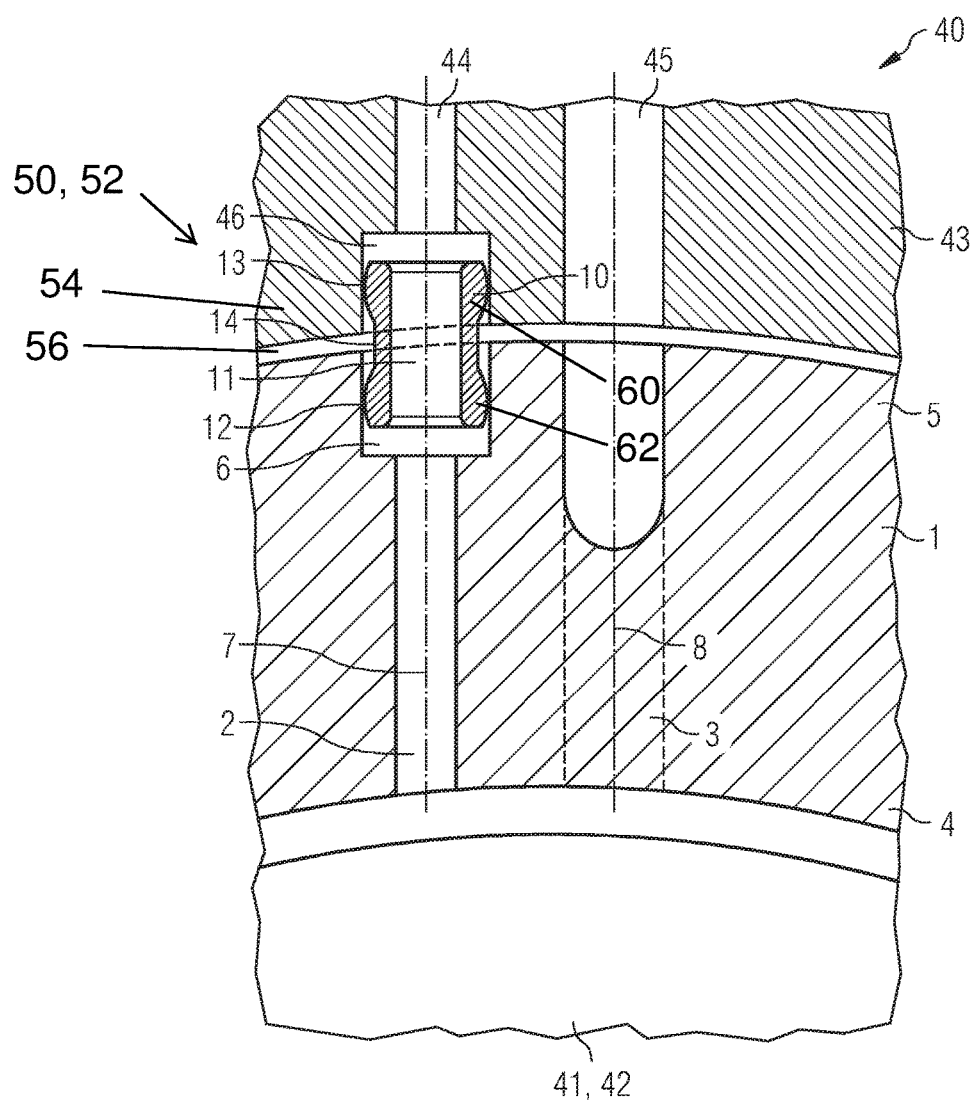
FIG. 4 shows a first sectional view of a part of a steam turbine according to the invention.

FIG. 4 shows another sectional view of the embodiment of a steam turbine 40 according to the invention already shown in FIG. 2. The sectional plane in FIG. 4 is perpendicular to the sectional plane in FIG. 2. In addition to the features already described in respect to the steam turbine 40 in FIG. 2, a sealing member 10 as described in FIGS. 3a, 3b in the conduit built by the first passage 2, the recesses 6, 46 and the first hollow opening 44 is shown. It is clearly visible that the first sealing surface 12 is in contact with the recess 6 in the passage 2 of the sealing bush carrier 1 and the second sealing surface 13 is in contact with the recess 46 in the opening 44 of the housing 43. Also clearly visible is that by providing a section 14 with smaller extent between the two sealing surfaces 12, 13, relative movements of the sealing bush carrier 1 and the housing 43, for example during an alignment procedure, are possible, without losing the steam tight sealing provided by the sealing member 10. This is due to the fact that the section 14 allows a tilt of the sealing member 10. The sealing surfaces 12, 13, constructed in the shown embodiment as symmetrical spherical segments, remain in contact with the respective recesses 6, 46 without interruption and therefore without breaking the steam tight sealing provided by the sealing member 10. In an example embodiment, the sealing member 10 spans the interlocking features 52 of the interlocking arrangement 50. For example, a first sealing end 60 of the sealing member 10 or a second sealing end 62 of the sealing member 10 may be disposed in the protrusion 54.

The invention claimed is:

1. A sealing bush carrier for a steam turbine, the steam turbine at least comprising a rotor and a turbine housing, wherein the sealing bush carrier is configured to be arranged between a shaft of the rotor and the turbine housing, the sealing bush carrier comprising:
   an interlocking arrangement which geometrically interlocks the sealing bush carrier directly with the turbine housing, and
   at least two hollow passages which extend from a rotor-facing part of the sealing bush carrier to a housing-facing part of the sealing bush carrier, the at least two hollow passages adapted to be assigned to corresponding hollow openings in the turbine housing for an extraction of steam of the steam turbine through the at least two hollow passages of the sealing bush carrier into the corresponding hollow openings of the turbine housing, wherein the at least two hollow passages communicate with the corresponding hollow openings through the interlocking arrangement, and wherein ends of the at least two hollow passages which face the rotor are spaced axially with respect to the rotor.

2. The sealing bush carrier according to claim 1,
wherein the at least two hollow passages in the sealing bush carrier are arranged to allow the extraction of steam at different steam pressure levels.

3. The sealing bush carrier according claim 1, further comprising:
a sealing member disposed in at least one of the at least two hollow passages and in a corresponding hollow opening.

4. The sealing bush carrier according to claim 3,
wherein the sealing member comprises an aperture.

5. The sealing bush carrier according to claim 4,
wherein the aperture comprises a substantially cylindrical aperture.

6. The sealing bush carrier according to claim 3,
wherein the sealing member comprises two sealing surfaces, one of them assigned to the at least one of the at least two hollow passages in the sealing bush carrier, the other adapted to be assigned to the corresponding hollow opening in the turbine housing.

7. The sealing bush carrier according to claim 6,
wherein the two sealing surfaces are arranged spaced to each other along the sealing member such that a section of the sealing member with a smaller extent is located between the two sealing surfaces.

8. The sealing bush carrier according to claim 6,
wherein the two sealing surfaces are spherical segments.

9. The sealing bush carrier according to claim 8,
wherein the spherical segments comprise symmetrical spherical segments.

10. The sealing bush carrier according to claim 3,
wherein the sealing bush carrier comprises a separate sealing member in a respective one of the at least two hollow passages of the sealing bush carrier.

11. The sealing bush carrier according to claim 3,
wherein the sealing member comprises creep resistant steel.

12. The sealing bush carrier of claim 3, wherein the interlocking arrangement comprises a protrusion and a cavity that interlock with each other, and wherein the sealing member is disposed in the protrusion.

13. A steam turbine, the steam turbine at least comprising the rotor comprising the shaft, the turbine housing, and the sealing bush carrier,
wherein the sealing bush carrier is constructed according to claim 1.

14. The steam turbine according to claim 13,
wherein the turbine housing comprises at least two hollow openings and each of the at least two hollow passages in the sealing bush carrier corresponds to one of the corresponding hollow openings of the at least two hollow openings.

15. The steam turbine according to claim 14,
wherein the sealing bush carrier comprises a sealing member in at least one of the at least two hollow passages, arranged at that end of the at least one of the at least two hollow passages corresponding to a respective one of the corresponding hollow openings in the turbine housing, wherein both the sealing bush carrier and the turbine housing comprise a recess for the mounting of the sealing member, and wherein the sealing member spans interlocking geometric features of the interlocking arrangement.

16. The sealing bush carrier according to claim 1, wherein ends of the at least two hollow passages which face the housing share a common axial position along a longitudinal axis of the rotor.

17. A sealing bush carrier for a steam turbine, the steam turbine comprising a rotor and a turbine housing, wherein the sealing bush carrier is configured to be disposed between a shaft of the rotor and the turbine housing, the sealing bush carrier comprising:

two hollow passages, each of which extends from a rotor-facing part of the sealing bush carrier to a housing-facing part of the sealing bush carrier, each adapted to be assigned to a respective hollow opening in the turbine housing, each adapted to extract steam of the steam turbine through the two hollow passages of the sealing bush carrier into the respective hollow openings of the turbine housing, and each comprising a respective recess at the housing-facing part of the sealing bush carrier, a protrusion and a cavity that geometrically interlock the sealing bush carrier directly to the turbine housing, and a sealing member seated in at least one recess of the respective recesses, the sealing member comprising a first sealing end, a second sealing end, and a separating section there between, wherein each sealing end comprises a sealing surface comprising an annular shape about a longitudinal axis of the sealing member, the annular shape comprising a convex shape along the longitudinal axis, wherein the first sealing end is disposed in the at least one recess and contacts an inner wall of the at least one recess, and wherein the sealing surface enables misalignment between the sealing member and the at least one recess while maintaining contact between the sealing member and the inner wall, wherein the first sealing end or the second sealing end is disposed in the protrusion, and wherein respective ends of the two hollow passages which face the rotor are spaced axially apart from each other with respect to the rotor.

18. The sealing bush carrier of claim 17, wherein respective ends of the two hollow passages which face the turbine housing share a common axial position along a longitudinal axis of the rotor.

* * * * *